United States Patent
Ferg

(10) Patent No.: US 10,919,245 B1
(45) Date of Patent: Feb. 16, 2021

(54) INTERNAL TIRE BALANCING OF RUBBER TIRES ON RIMS

(71) Applicant: Thomas Eugene Ferg, Houston, TX (US)

(72) Inventor: Thomas Eugene Ferg, Houston, TX (US)

( * ) Notice: Subject to any disclaimer, the term of this patent is extended or adjusted under 35 U.S.C. 154(b) by 137 days.

(21) Appl. No.: 15/722,874

(22) Filed: Oct. 2, 2017

Related U.S. Application Data

(60) Provisional application No. 62/403,136, filed on Oct. 1, 2016.

(51) Int. Cl.
*B29D 30/06* (2006.01)
*B60C 19/00* (2006.01)
*B29D 30/72* (2006.01)
*B60C 13/00* (2006.01)

(52) U.S. Cl.
CPC ........ *B29D 30/0681* (2013.01); *B60C 19/003* (2013.01); *B29D 2030/0634* (2013.01); *B29D 2030/0635* (2013.01); *B29D 2030/0637* (2013.01); *B29D 2030/0638* (2013.01); *B29D 2030/726* (2013.01); *B29D 2030/728* (2013.01); *B60C 13/001* (2013.01)

(58) Field of Classification Search
CPC .... B29D 2030/0072; B29D 2030/0637; B29D 2030/726; B29D 2030/728; B29D 30/0633; B29D 30/0634; B29D 30/0637; B29D 30/0681; B29D 2030/0634; B29D 2030/0635; B60C 19/002; B60C 19/003; B60C 13/001; B60C 17/009; F16F 15/324; G01M 1/32; G01M 1/326
USPC .............................. 152/154.1; 156/75, 110.1
See application file for complete search history.

(56) References Cited

U.S. PATENT DOCUMENTS 2,193,734 A * 3/1940 MacCracken ......... F16F 15/324
156/75
4,016,020 A * 4/1977 Ongaro .................. B24B 5/366
156/75
4,068,898 A * 1/1978 Hanson ................. F16F 15/324
116/200

(Continued)

FOREIGN PATENT DOCUMENTS

KR 20040094919 A * 11/2004

OTHER PUBLICATIONS

Kim Byeong Jo, KR-20040094919-A, machine translation. (Year: 2004).*

*Primary Examiner* — Robert C Dye
*Assistant Examiner* — Sedef E Paquette
(74) *Attorney, Agent, or Firm* — Karen B. Tripp

(57) ABSTRACT

A process for balancing a rim and tire, which comprises first balancing the rim, then mounting the tire, properly inflating it and balancing a second time to determine the location and weight of balancing required. The tire and rim are then indexed with marks to indicate where the balancing weights should be placed. These indexing marks will be used at the remounting stage to assure proper balancing. The tire is then deflated and removed from the rim and the correct mass rubberized weights are vulcanized to the internal surface of the tire sidewall at the indexing mark and on the opposite sidewall across from the indexing mark. The tire is then installed back on the rim with the indexing marks lined up next to each other. The tire is re-inflated and the balance re-checked with a spin balancing machine.

9 Claims, 11 Drawing Sheets

(56) References Cited

U.S. PATENT DOCUMENTS

| | | | | |
|---|---|---|---|---|
| 6,579,389 B1* | 6/2003 | Kobayashi | ............... | B60C 19/00 |
| | | | | 152/154.1 |
| 7,332,047 B2* | 2/2008 | Majumdar | ......... | B29D 30/0662 |
| | | | | 152/154.1 |
| 2003/0205080 A1* | 11/2003 | Shteinhauz | ......... | G01M 17/022 |
| | | | | 73/146 |
| 2004/0244483 A1* | 12/2004 | Gerdes | .................... | G01M 1/02 |
| | | | | 73/459 |
| 2006/0273652 A1* | 12/2006 | Winch | .................. | F16F 15/328 |
| | | | | 301/5.21 |
| 2007/0126279 A1* | 6/2007 | Fogal | ...................... | B60B 21/00 |
| | | | | 301/5.22 |
| 2008/0128093 A1* | 6/2008 | Rogalla | .................. | B25J 15/106 |
| | | | | 157/1.28 |
| 2009/0134694 A1* | 5/2009 | Yukawa | ................ | B60C 19/002 |
| | | | | 301/6.91 |

* cited by examiner

INTERNAL TIRE BALANCING OF RUBBER TIRES ON RIMS

RELATED APPLICATION

This application claims priority from U.S. Provisional Patent Application No. 62/403,136, filed Oct. 1, 2016.

FIELD

This invention relates to a method and apparatus for balancing of pneumatic rubber tires (comprised of natural and/or synthetic rubber) on vehicle rims. This invention can be used for consumer vehicles as well commercial vehicles and heavy equipment with inflatable tires. The invention relates to balancing of all types of inflatable rubber tires on rims.

BACKGROUND

Tire balance generally describes the distribution of mass within a tire or the entire wheel (including the rim) to which the tire is attached. When the wheel rotates, asymmetries of mass may cause it to hop or wobble, which can cause ride disturbances, usually vertical and lateral vibrations. It can also result in a wobbling of the steering wheel or of the entire vehicle. The ride disturbance, due to unbalance, usually increases with speed. Thus, thickness variations in tire components such as the bead, filler, liner, belting, and tread necessitates that the tires be balanced on rims before the wheels are mounted onto a vehicle.

Tires are balanced in factories and repair shops by two methods: static balancers and dynamic balancers. Tires with high unbalance forces are downgraded or rejected. When tires are fitted to wheels at the point of sale, they are measured again on a balancing machine, and correction weights are applied to counteract the combined effects of tire and wheel unbalance. After sale, tires may be rebalanced if the driver perceives excessive vibration or wear.

Static balance can be measured by a static balancing machine where the tire is mounted on the rim, properly inflated and placed horizontally on a vertical axis non-rotating spindle tool. Double weights are placed on the tire outer surface where the tire meets the rim. The weights are adjusted until the tire/rim is horizontal. Then the weights are hammered onto the rim at this circumferential location on the curb side outboard flange and on the car side inboard flange of the wheel.

Dynamic spin balancing is typically considered better or at least more comprehensive than static balance alone, because dynamic balance measures and corrects for both static and dynamic forces.

Dynamic balance describes the forces generated by asymmetric mass distribution when the tire is rotated, usually at a high speed. In the tire factory, the tire and wheel are typically mounted on a balancing machine test wheel, the assembly is accelerated up to a speed of 100 RPM (10 to 15 mph with recent high sensitivity sensors) or higher, 300 RPM (55 to 60 mph with typical low sensitivity sensors), and forces of unbalance are measured by sensors as the tire rotates. These forces are resolved into static and couple values for the inner and outer planes of the wheel, and compared to the unbalance tolerance (the maximum allowable manufacturing limits).

In tire retail shops, tire/wheel assemblies are typically checked on a spin-balancer, which determines the amount and angle of mass unbalance and the proper location for placement of the counterbalancing weights. That is, typically, a properly sized tire is mounted on a rim and inflated to the manufacturer's designed pressure. Then the wheel, tire mounted on rim, is dynamically balanced using a spin balancing machine. This machine is designed and programmed to rotate the wheel at a specific RPM (rotations per minute) in order to determine where counterbalance weights should be located and their mass.

Conventional balancing weights are of two types:

(1) The first type are lead weights that are mounted onto the inboard and outboard flange of the rim by means of an integrated steel clip; and (2) the second are plastic coated weights that are placed on the internal radius of the rim and are held in place by a high strength adhesive backing. These weights are placed on the internal radius of the rim in the area behind the rim spokes.

For external lead balancing weights, one half of the determined balancing weight mass is mounted on the rim outboard flange and the other half is mounted on the rim inboard flange at the machine-determined balancing location on the wheel. The steel clip component of the weight is driven onto the rim/tire margin with a hammer and held in place by friction.

These weights are unsightly and they can be dislodged by constant vibration and sudden later force impacts. When the weights fall off and end up in the environment they represent a lead pollution hazard. Consequently, lead weights have been banned in Europe and in some states in the United States.

Many higher priced end rims are designed with different inboard and outboard flanges that will not hold standard lead balancing weights in place. These wheels are designed to be counterbalance weighted using high strength adhesive-backed weights which are placed in the wheel barrel external to the inflation area near the centerline of the rim.

These weights can also be dislodged as adhesive strength is diminished at higher ambient temperatures and through adhesive degradation with time. Constant vibration and sudden later force impacts can also dislodge these weights. Also, these weights may be seen through the spokes of the rim and are considered to be unsightly.

Further, the majority of these adhesive backed weights contain lead weighting components, which when they fall off, end up in the environment representing a pollution hazard.

SUMMARY

The present invention provides an alternative balancing system for tires that avoids unsightliness of weights added for balance and that avoids risk of the weights becoming lost into the environment with use.

According to the invention, providing a process or method for balancing a rim and tire, the rim is evaluated for balance first, without the tire. Then the balance is checked with the tire mounted on the rim, with the tire properly inflated. The location for adding weights to the tire for obtaining proper or desired balance, such as the balance recommended by the tire manufacturer, are determined. The tire and rim are then indexed with marks to indicate where the balancing weights should be placed. (These indexing marks will be used at the remounting stage to assure proper balancing.) The tire is then deflated and removed from the rim and correct mass rubberized weights are vulcanized to the internal surface of the tire sidewall at the indexing mark and on the opposite sidewall across from the indexing mark.

The tire is then installed back on the rim with the indexing marks lined up next to each other. Finally, the tire is re-inflated and the balance re-checked, such as with a spin balancing machine.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Figure 1:
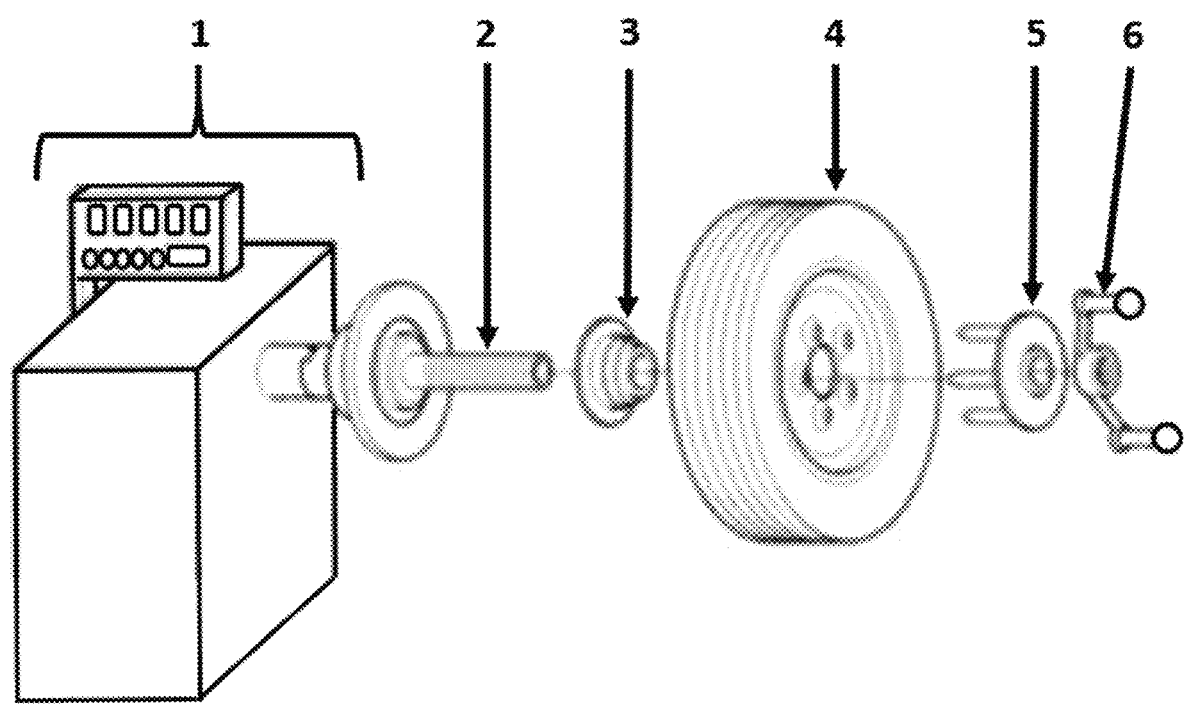
FIG. 1 is an example of a dynamic wheel balancing machine and it's parts.

Turning now to the detailed description of the preferred arrangement or arrangements of the present invention, it should be understood that the inventive features and concepts can be manifested in other arrangements and that the scope of the invention is not limited to the embodiments described or illustrated. The scope of the invention is intended only to be limited by the scope of the claims that follow.

According to the present invention, in balancing a tire, particularly a pneumatic tire or air inflated rubber tire, the rim without the tire is first checked for balance. That is, the rim is first placed on the spin balancing machine by itself (without the tire) with the inflation stem, valve and cap installed. The rim is checked for balance, and if the rim is out of balance, a properly sized weight (mass) is adhered, for non-limiting example, with quick setting two components epoxy, at the centerline of the rim or within the inflation envelope at the centerline of the rim. An example of such an adhesive is Loctite 330 epoxy with Loctite 7387 spray activator.

The balanced rim is again placed on the spin balancing machine and rotated for confirmation of proper balance.

The tire is then mounted on the balanced rim, inflated to proper design pressure, mounted on a balancing machine and checked for balance. The proper weight (mass) is noted and the rim and tire are both indexed on the curb side of the rim and tire with adjacent marks at the point where balance weights should be placed. The tire is then deflated and removed from the rim. The indexing mark is transferred across the tire from the curb side face to the car side face of the tire. These marks will be used to show the location to which the balancing weights are to be vulcanized. The area on the inner liner at the sidewall inside the tire is where the rubberized balancing weights will be vulcanized to the tire. This area should be cleaned on the front and back of the tire at the marks, preferably with a clean cloth which has been wet with an appropriate pre-buff liner cleaner, to remove any remaining form release agents which were used in the manufacture of the tire and/or dust and debris. A clean scraper may/should also be employed if deemed necessary.

Rubberized weights, preferably with a protective coating, should be dry fitted on the internal tire liner with their center line matched up to the index marks previously made on the exterior of the tire. A marker such as for non-limiting example a yellow crayon, should be used to mark with an offset, preferably about one-half inch offset, around where the rubberized weight will be adhered. This is done to show the area which is to be wire buffed. A small hand drill driven wire wheel may then be used to lightly rough up the area within the crayon marked area. The inside of the tire and more specifically the buffed surfaces should be vacuumed clean to remove any created rubber dust. The prepared areas within the crayon outlines are next cemented completely with a suitable vulcanizing adhesive and allowed to dry. Any protective covering on the backside (contact side) of the rubberized balancing weight should be removed and discarded, taking care not to touch the bonding area on both the tire and the balancing weight.

The weight centerline triangle marker (that is, the mark indicating the weight centerline for the tire), is then aligned internally with the indexing mark on the exterior of the tire. The rubberized weight is stitched down thoroughly with a stitching tool, preferably working from the center out. Any top protective coating on the rubberized weight is removed and discarded.

The above weight alignment and stitching process is repeated for the second weight.

The tire is then remounted on the rim with the two initial indexing marks lined up next to each other, properly inflated and the rim/tire placed on the spin balancing machine in order to confirm that the tie and rim are now properly balanced.

This procedure of rim balancing and tire/rim balancing is to be repeated for the remaining tires and rims.

Referring now to the figures for further illustration of the invention, FIG. 1 shows a dynamic wheel balancing machine, for reference, with the operating console 1, rotating threaded spindle 2, back cone 3, tire mounted on rim 4, pin plate 5 and mounting wing nut 6. The correct outside diameter back cone 3 is placed or slid onto the spindle 2 followed by the tire mounted onto the rim 4. The car side of the rim is mounted toward the back cone 3; this is followed by the pin plate 5 and seated with proper compression by spinning the wing nut 6 on the threaded spindle 2.

Figure 2:
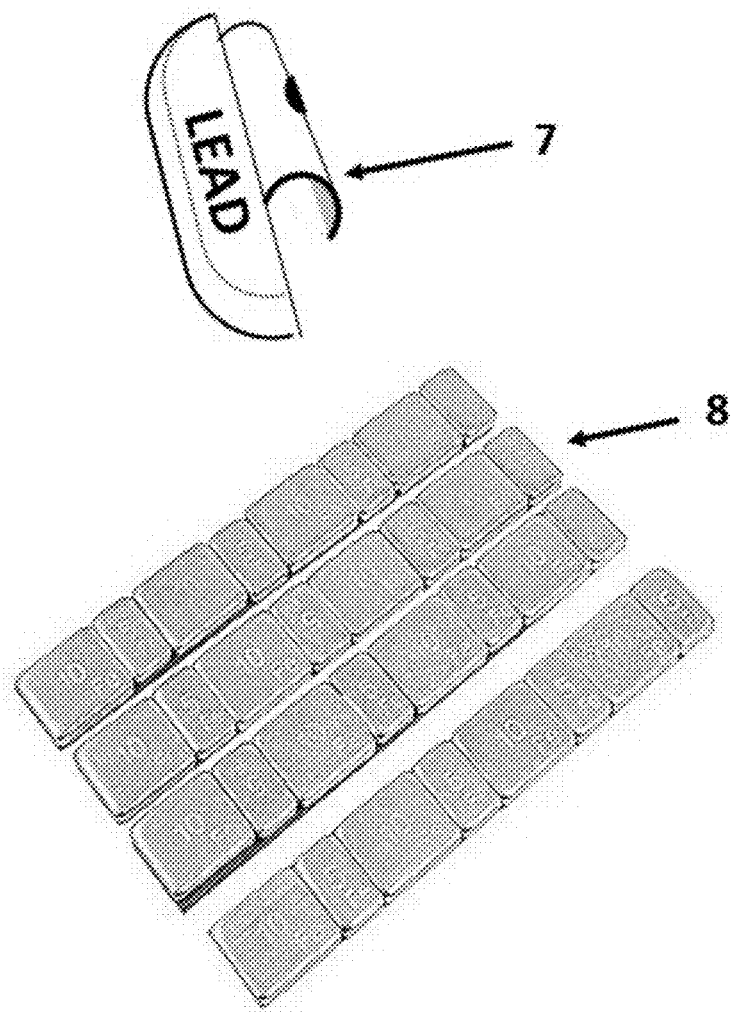
FIG. 2 shows the two main types of generic wheel balancing weights.

FIG. 2 shows generic lead weights 7 (including an associated steel clip) mounted as a set on opposite sides of the rim barrel and mounted by hammering the steel clip onto the inboard and outboard flanges at the rim tire interface. FIG. 2 also shows generic adhesive backed weights 8 which are used by sticking them on the exterior of the rim at the car side of the rim.

Figure 3:
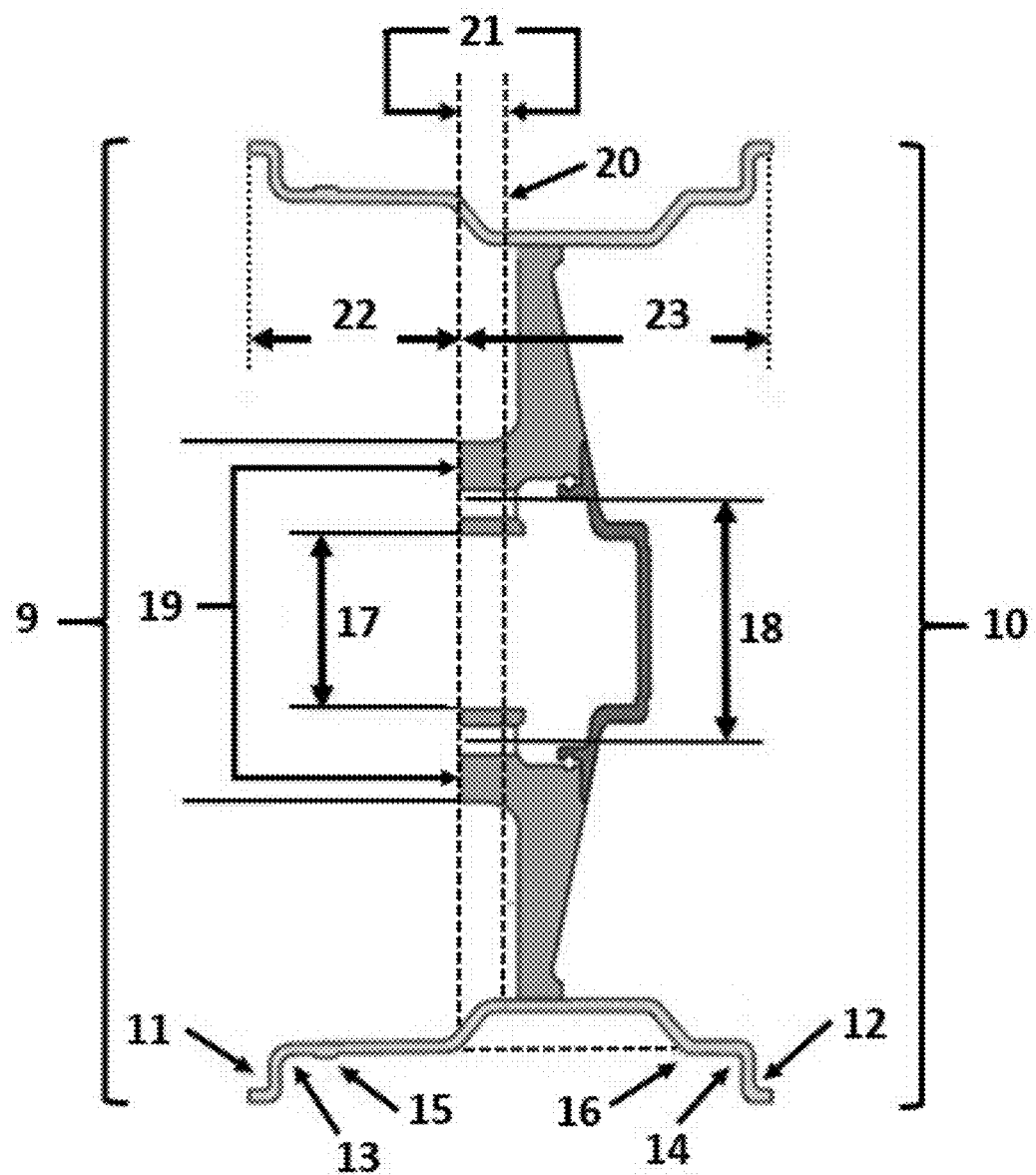
FIG. 3 shows a typical rim in cross-section.

FIG. 3 shows the cross section of a rim, with the car side of the rim 9, the curb side of the rim 10, the inboard flange 11, the outboard flange 12, the inboard bead seat 13, the outboard bead seat 14, the inboard safety hump 15, the outboard safety hump 16, the center bore 17, the bolt circle diameter 18, the axel pad 19, the wheel centerline 20, the wheel offset from centerline 21, the back spacing 22 and the wheel front spacing 23.

Figure 4:
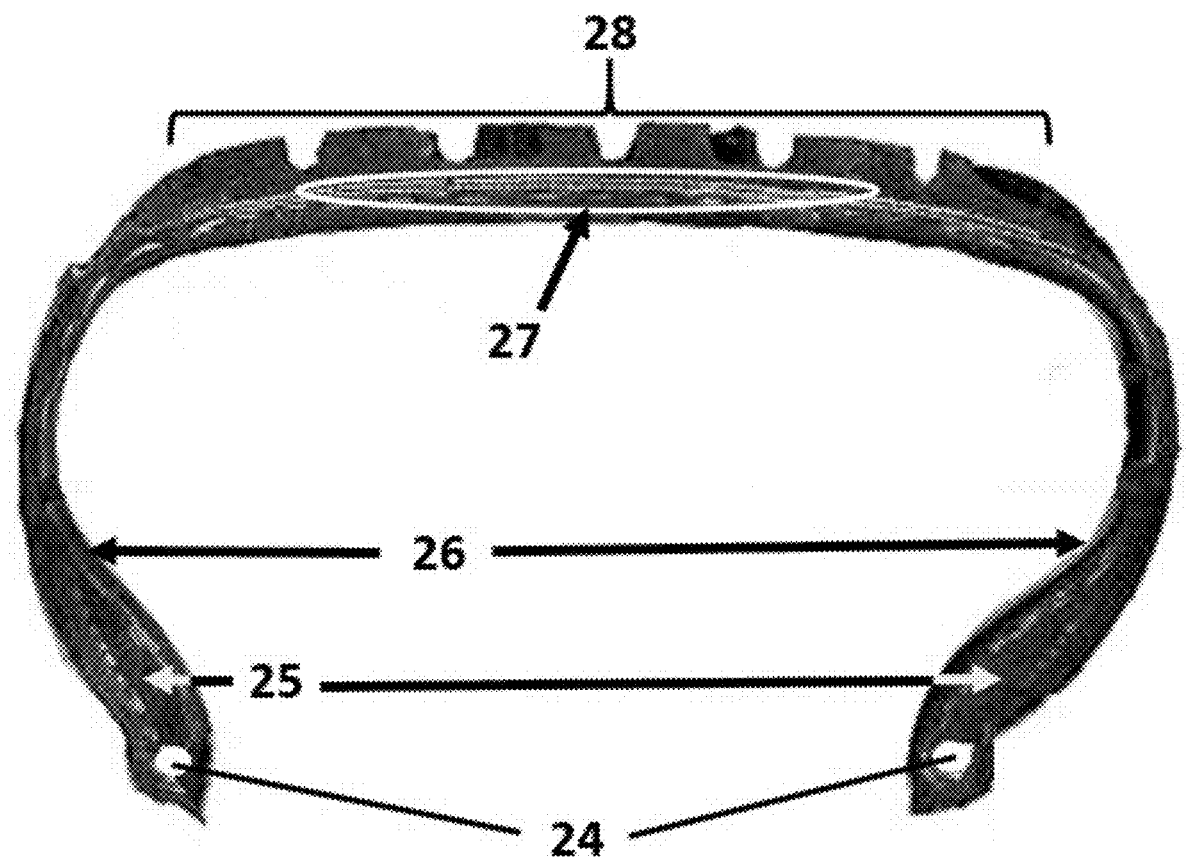
FIG. 4 shows a typical tire cross-section with tire components.

FIG. 4 shows a cross section of a tire suitable for balancing according to the invention and indicating components as follows: the bead 24, the filler 25, the liner 26, the belting 27, and the tread 28.

Figure 5:
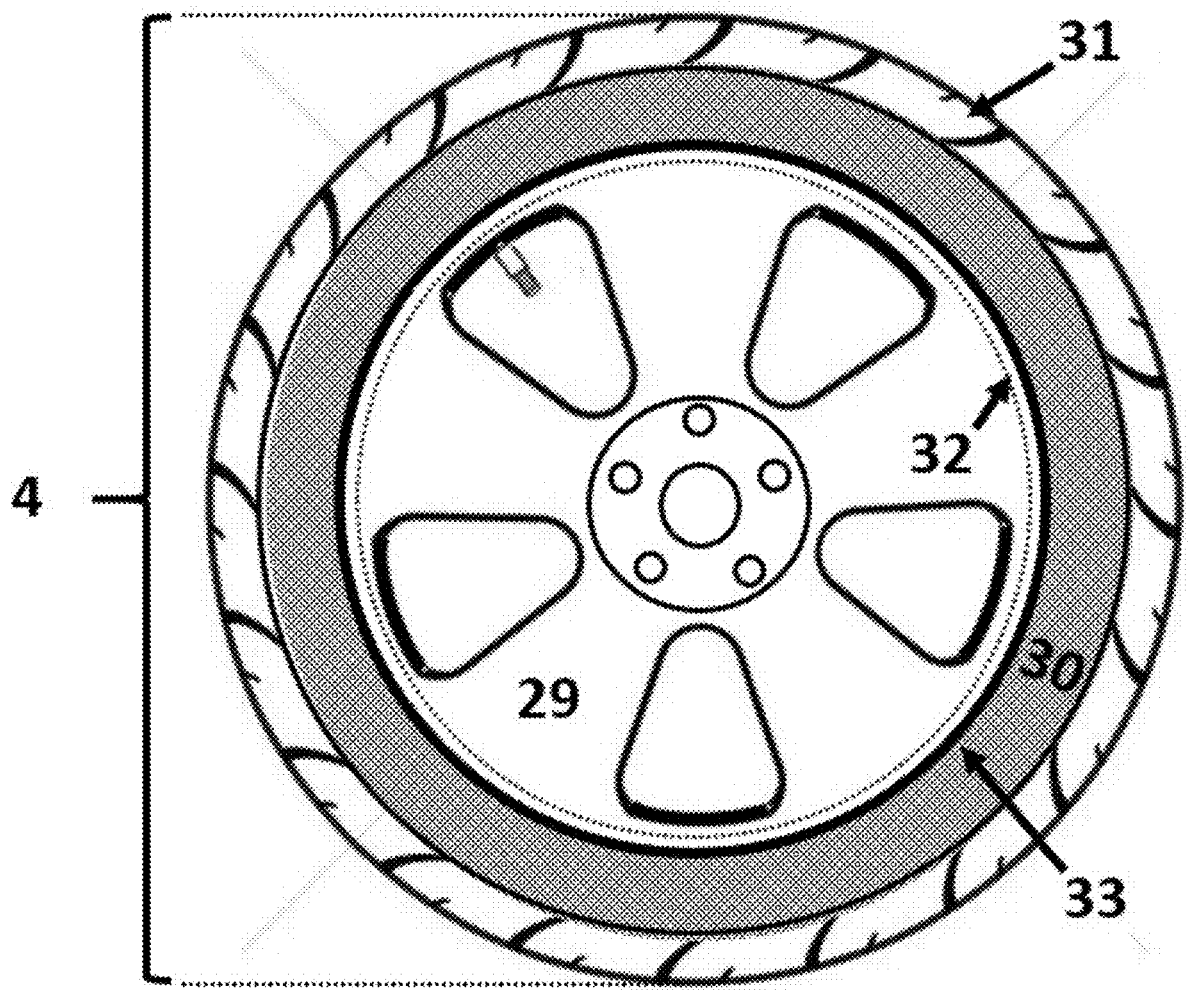
FIG. 5 shows a tire mounted on a rim.

FIG. 5 shows the tire mounted on the rim 4 with the following indicated: the rim 29, the tire sidewall 30, the tire tread 31, the barrel surface of the rim 32, and the rim flange tire interface 33.

Figure 6:
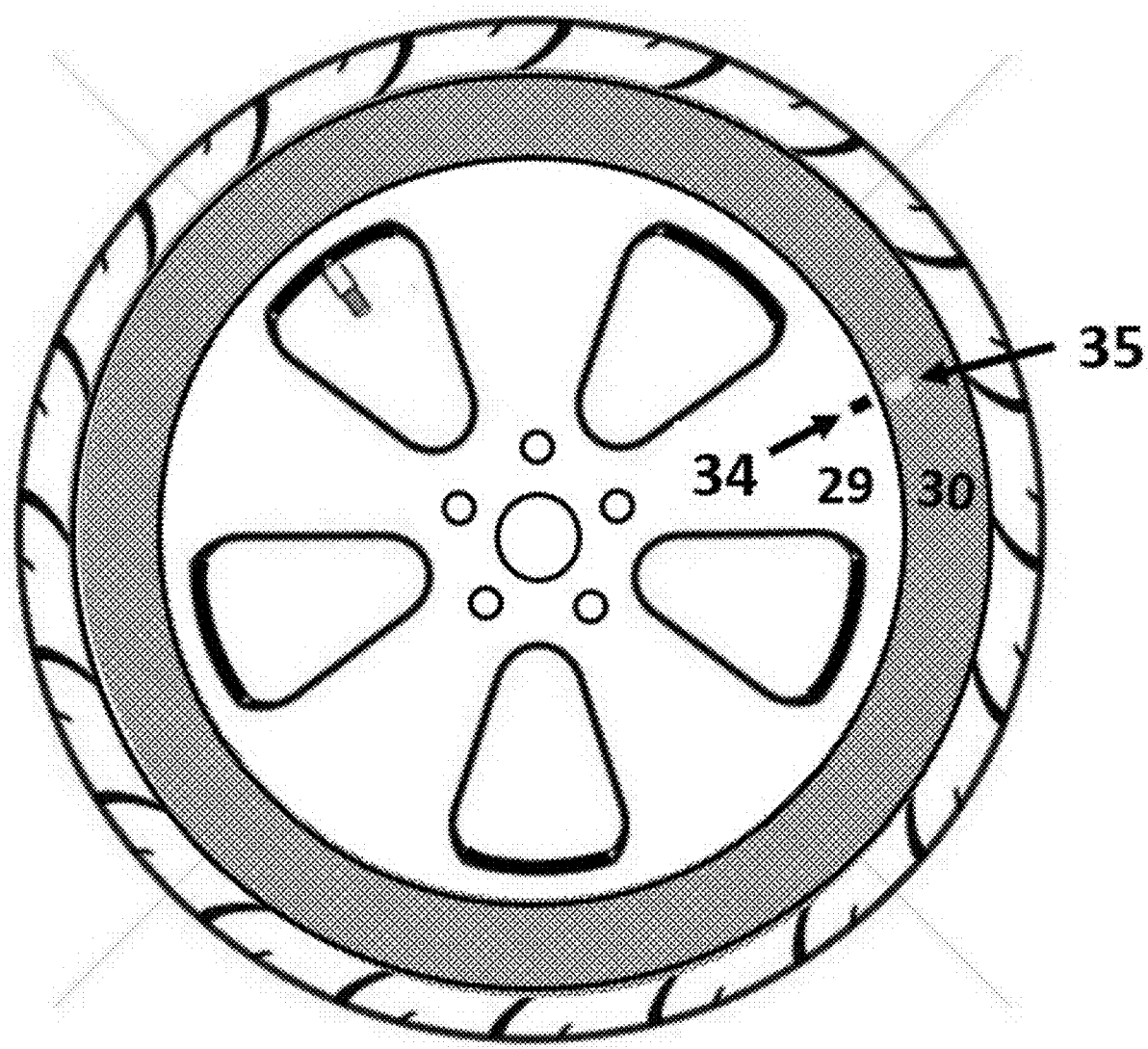
FIG. 6 shows indexing marks on rim and tire.

FIG. 6 shows the curb side of a tire mounted on a rim with the rim indicated as 29 and the tire sidewall 30. The point of balancing weight placement is indicated at the indexing mark on the rim by the number 34, and the point of balancing weight placement on the tire is indicated by indexing mark 35.

Figure 7:
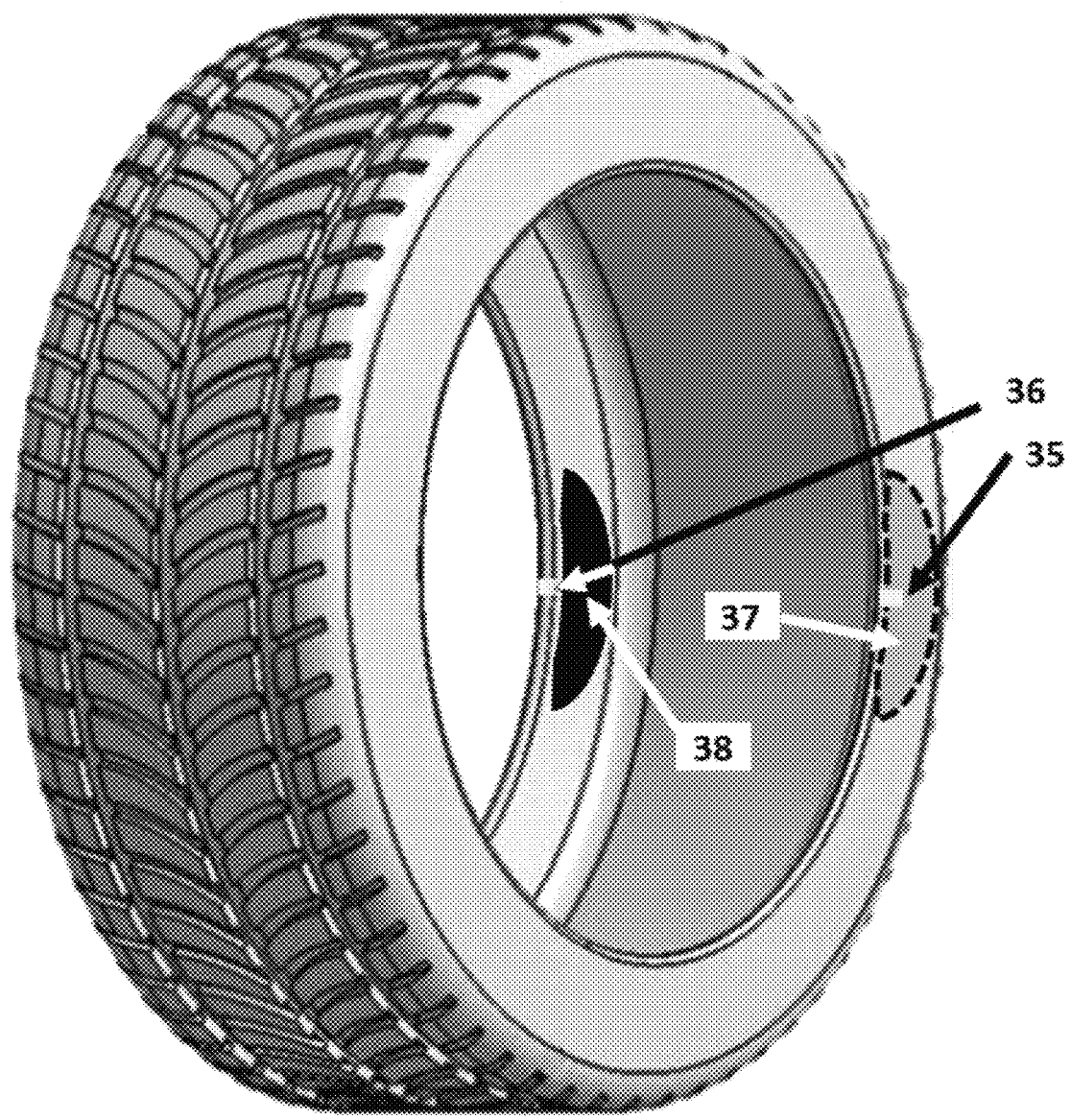
FIG. 7 shows internal weights vulcanized to internal tire sidewalls.

FIG. 7 shows the tire removed from the rim after balancing weight and location have been determined and index marked as the number 35. The location of the indexing mark along the circumference of the tire is transferred across the tire from the curb side of the tire to the car side of the tire 36. The placement of the weights, which have been vulcanized to both the car side sidewall and the curb side sidewall at the indexing marks, are indicated as 37 for the curb side of the tire and as 38 for the car side of the tire.

Figure 8:
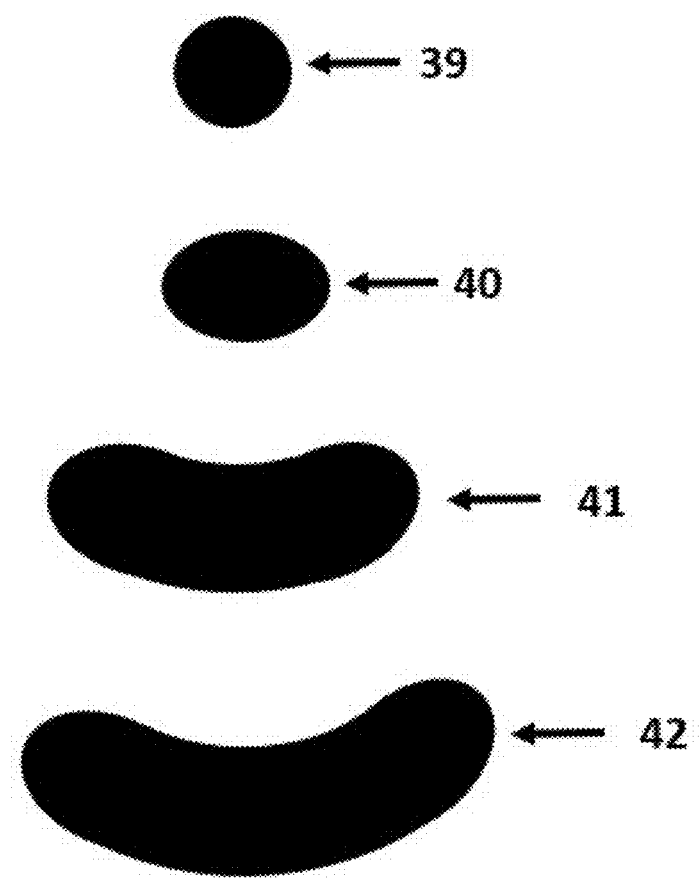
FIG. 8 shows example of possible rubberized weight shapes.

FIG. 8 show just a few possible shapes for the rubber coated balancing weights. The range goes from a circle 39, to an oval 40, to a "sausage shape" 41, and a "banana shape" 42. The weights can ultimately be any shape, but should be designed to conform to the internal sidewall of the tire and be symmetric at the centerline/mass of the rubberized weight.

Figure 9:
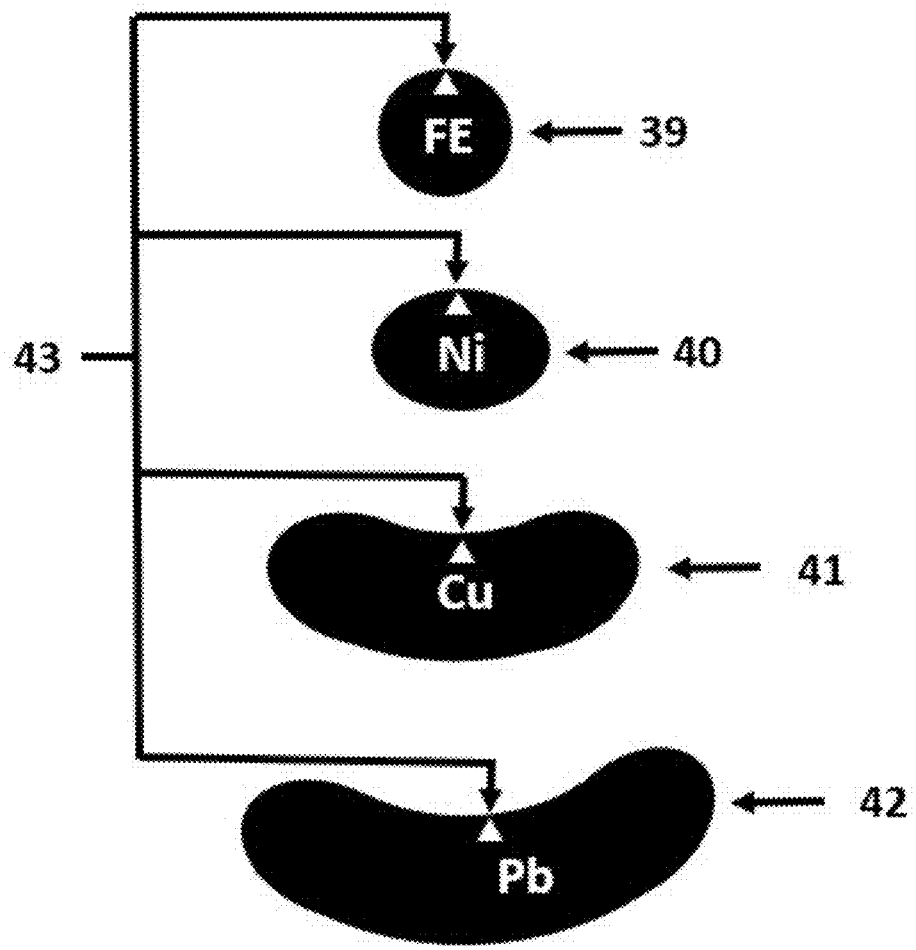
FIG. 9 shows weights labelled with incorporated metallic non-rubber weighting material.

FIG. 9 shows that the weighting material within the rubberized weight should preferably be marked with a symbol for what it is. That is, looking at the Periodic Table of the Elements, as an example, Fe (39 in FIG. 9) is the symbol for Iron, and Ni (40 in FIG. 9) is the symbol for Nickel, Cu (41 in FIG. 9) is the symbol for Copper, and Pb (42 in FIG. 9) is the symbol for Lead. The centerline of the weight is indicated with a triangle. This triangle marker on the rubberized weight 43 indicates the centerline of the rubberized weight/mass, which will be lined up inside of the tire liner across from the external indexing marks.

Figure 10:
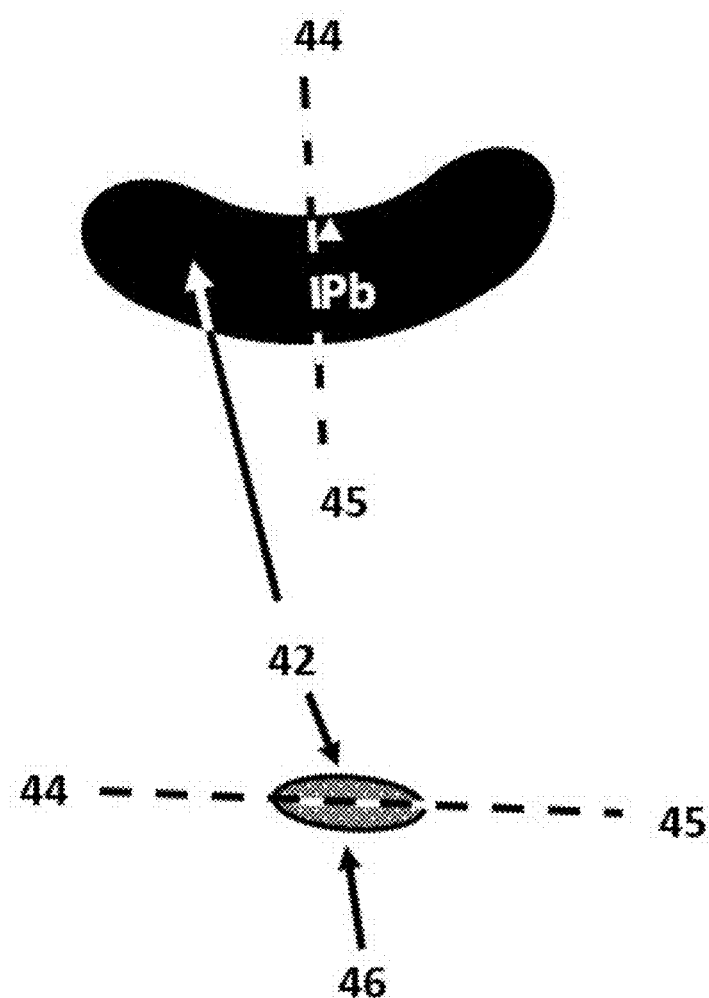
FIG. 10 shows a cross-section example of a rubberized weight.

FIG. 10 shows a cross section of the rubberized weight from (44) to (45). The adhering surface is indicated by the number 46 and the top surface which is labeled with the metallic weighting material symbol and the centerline triangle is indicated by the number 42.

Figure 11:
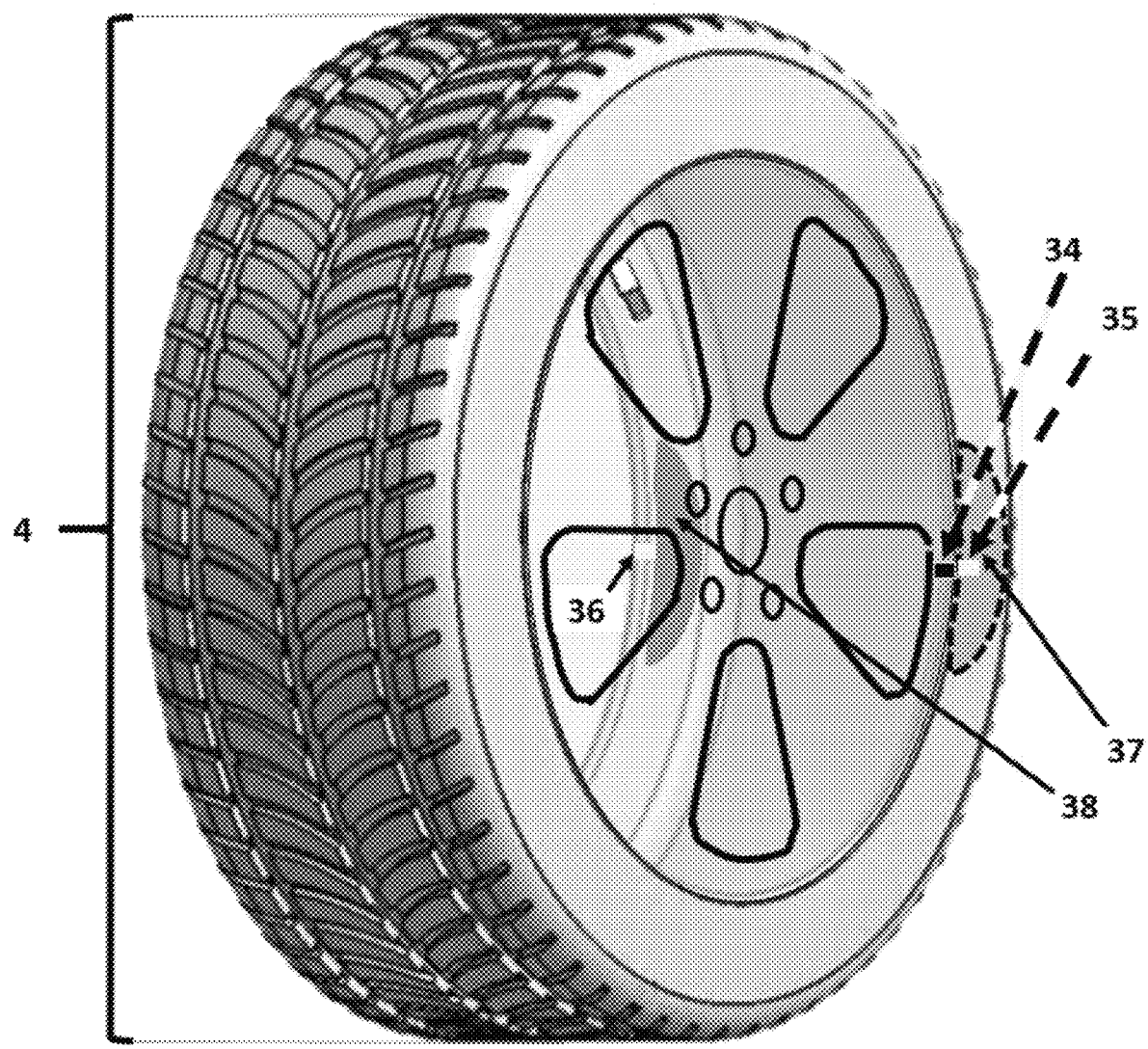
FIG. 11 shows tire mounted on rim with indexing marks lined up after weights have been vulcanized in their correct locations on the inside of the tire.

FIG. 11 shows an internally balanced tire placed on the rim 4. The weights vulcanized to the internal sidewalls of the tire according to the invention are indicated by the number 37 for the tire curb side and the number 38 for the tire car side. The previously drawn index mark on both the rim 34 and the tire 35 were aligned when the tire was placed back on the rim prior to inflation.

What is claimed is:

1. A process for internally balancing a pneumatic tire to or within tire manufacturer specifications or requirements for said tire, wherein said tire can have balance and a distribution of weight which can be supplemented at one or more locations on the tire with counterbalancing weights having mass to obtain said balance, for use on a car or other vehicle, which for said use the tire is installed on a rim, and when installed on said rim will have a curb side and an opposite car side, said tire comprising natural or synthetic rubber, a tire liner, and an inside sidewall, and said counterbalancing weights each having a weight centerline marking, wherein the process comprises the following series of steps:

a) balancing the rim on a balancing machine if necessary;

b) mounting the tire on the rim, inflating the tire to or within said tire manufacturer specifications or requirements, checking the balance of said tire on the rim on said balancing machine, and determining the location and mass of counterbalancing weights which said machine indicates are needed on the tire for said internal balancing;

c) placing a first indexing mark on the rim and a second indexing mark on the tire at the weighting location such that the second indexing mark is adjacent the first indexing mark on the rim, and deflating and removing the tire from the rim;

d) transferring the second indexing mark on the tire from the curb side to the opposite car side of the tire to make a tire sidewall indexing mark;

e) cleaning and preparing the tire liner for attachment of said counterbalancing weights at the second indexing mark and the tire sidewall indexing mark, wherein said counterbalancing weights are rubberized weights;

f) applying vulcanizing rubber cement in preparation for attaching said counterbalancing weights;

g) aligning the weight centerline marking of the respective counterbalancing weight with the tire sidewall indexing mark;

h) attaching by vulcanization the counterbalancing weights and stitching them down, wherein the weights are hidden from view on the tire when the tire is remounted on the rim;

i) remounting the tire on the rim, aligning the first and second indexing marks to be adjacent, inflating the tire to or within said tire manufacturer specifications or requirements; and j) placing the mounted tire and rim back on the balancing machine, and checking the internal balance of said tire on the rim on said balancing machine to confirm said balance is within tire manufacturer specifications or requirements for said tire.

2. The process according to claim 1 wherein the counterbalancing weights are hidden and not detectable when the tire is in use on the car or other vehicle.

3. The process according to claim 1 wherein the counterbalancing weights cannot accidentally be lost to the environment.

4. The process according to claim 1 wherein the counterbalancing weights are labeled to describe said counterbalancing weights.

5. The process according to claim 1 wherein each of said counterbalancing weights has the respective weight centerline marking to facilitate centering a counterbalancing weight at the second indexing mark and a counterbalancing weight at the tire sidewall indexing mark, wherein each weight centerline marking is a triangle.

6. The process according to claim 1 wherein each of said counterbalancing weights has a protective covering which is removed just prior to installation.

7. The process according to claim 1 wherein each of said counterbalancing weights has a protective cover on the front side that is removed after the weight is stitched in place.

8. The process according to claim 5 wherein said internal balance can be fine-tuned by removing small amounts of the counterbalancing weight at the centerline of at least one of said counterbalancing weights with a small grinder.

9. The process according to claim 1 wherein the counterbalancing weights are permanently attached to the tire by a vulcanization process.

* * * * *